July 10, 1945.    V. S. COLLITO    2,380,150
SPHERICAL SELF-ALIGNMENT BEARING DEVICE
Filed Sept. 21, 1943    2 Sheets-Sheet 1
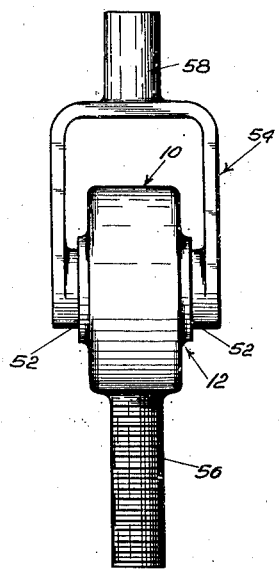
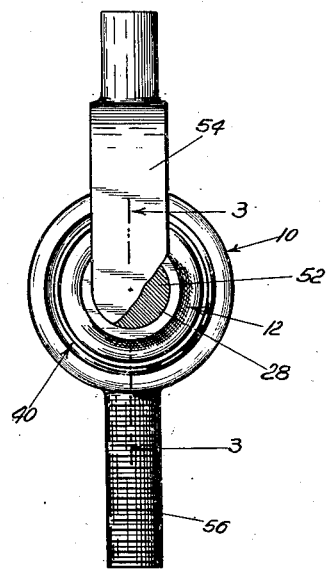
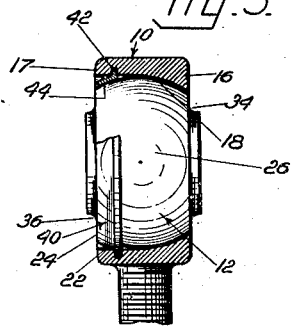
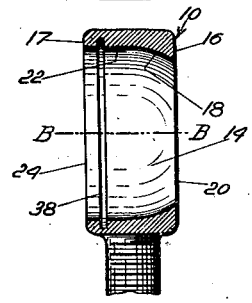
Victor S. Collito
Inventor
By Harry Cohn
Attorney

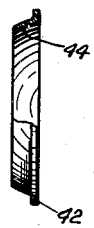
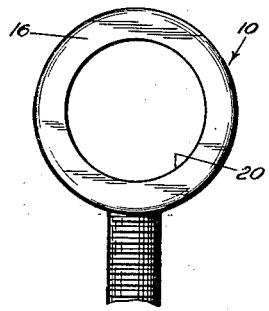
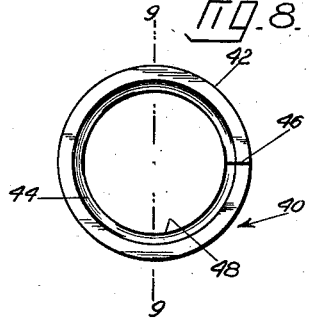
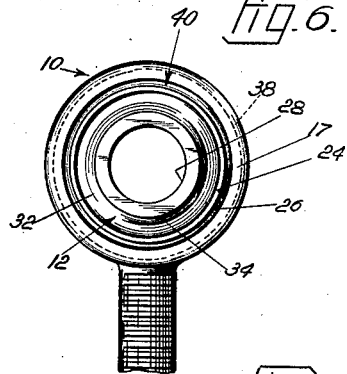
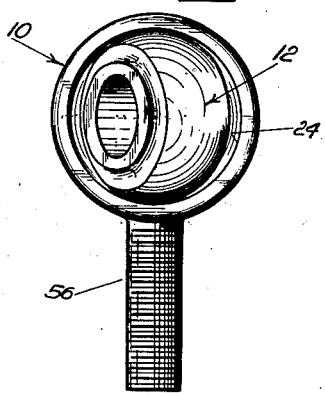
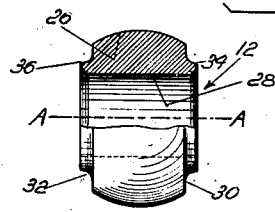

Patented July 10, 1945

2,380,150

UNITED STATES PATENT OFFICE 2,380,150

SPHERICAL SELF-ALIGNMENT BEARING DEVICE

Victor S. Collito, Newark, N. J.

Application September 21, 1943, Serial No. 503,192

3 Claims. (Cl. 308—72)

This invention relates to spherical self-alignment bearing devices.

One object of the invention is the provision of a spherical self-alignment bearing device comprising inner and outer bearing members which are constructed and arranged to facilitate the manufacture thereof and the assembly and arrangement of said bearing members in operative relation.

Another object of the invention is the provision of a self-alignment bearing device having a one-piece inner bearing member provided with a spherically convex peripheral surface and a peripherally continuous outer bearing member having an opening defined by a spherically concave peripherally bearing surface continuous with a laterally adjacent peripherally continuous cylindrical surface terminating at one end of said opening at one side of said outer bearing member to provide for the insertion of the inner bearing member in said opening, means being provided to retain said inner bearing member in operative relation in said opening and to provide a complemental concave bearing surface in bearing contact with said spherically convex surface of the inner bearing member.

A yet further object of the invention is generally to provide an improved spherical self-alignment bearing device.

The above and other objects, features and advantages of the invention will be fully understood from the following description, reference being had to the accompanying illustrative drawings.

In the drawings:

Fig. 1 is a side view of a spherical self-alignment bearing device embodying the present invention;

Fig. 2 is a view thereof taken at right angles to Fig. 1, parts being shown in section;

Fig. 3 is a sectional view on the line 3—3 of Fig. 2; a part of the device being omitted;

Fig. 4 is a sectional view of the outer bearing member;

Fig. 5 is a view in elevation of one side of the outer bearing member;

Fig. 6 is a side view in elevation of the other side of the bearing member with the inner bearing member positioned therein;

Fig. 7 is a view of the inner bearing member;

Fig. 8 is a side view of the retaining and complemental bearing member;

Fig. 9 is a sectional view on the line 9—9 of Fig. 8;

Fig. 10 is a view similar to Fig. 6, showing the latter positioned to permit the insertion of the retaining and complemental bearing member.

Referring now to the drawings in detail, the spherical self-alignment bearing device embodying the present invention comprises an outer bearing member 10 and an inner bearing member 12 which are formed of steel or other suitable material. The outer bearing member 10 is formed in one piece and is provided with an opening 14 within which the bearing member 12 is positioned, said opening extending transversely or axially of said bearing member between the opposite sides or faces 16 and 17 thereof. Said opening 14 is defined by a peripherally continuous spherically concave surface 18 which terminates in a circular edge 20 at one end of opening 14 and by a cylindrical peripherally continuous surface 22 which terminates at the other end of said opening and is defined by the circular edge 24 of the side 17 of the bearing member. Spherical surface portion 18 and cylindrical surface portion 22 are laterally continuous with respect to each other, the inner end of cylindrical surface 22 coinciding with the inner end of spherical surface 18, the axial extent of each of said bearing surfaces being substantially equal. The diameter of cylindrical surface 22 is at least equal to the maximum diameter of spherical surface 18, in a plane at right angles to the axis of cylindrical surface 22, said axis being coincident with central axis of opening 14. Thus one end of opening 14 which is defined by the circular edge 24 is of larger diameter than the opposite end of said opening which is defined by the circular edge 20 at the outer end of spherical surface 18.

The inner bearing member 12 is formed in one piece and has a spherically convex peripherally continuous surface 26 which has a bearing contact with the spherical surface 18 of the outer bearing member 10 in movable relation thereto in all directions. It will be understood that the radius of curvature of surface 26 is substantially equal to the radius of curvature of spherically concave surface 18, said first mentioned radius, however, being slightly smaller than the radius of surface 18. The maximum diameter of inner bearing member 12, that is the maximum diameter thereof in a plane at right angles to the axis A—A thereof (Fig. 7), is substantially equal to the diameter of cylindrical surface 22 but slightly smaller than the latter to provide clearance between the inner bearing member and said cylindrical surface to permit the insertion of said inner bearing member in the opening 14 of the outer bearing member 10 through the end thereof defined by the circular edge 24. Said inner bearing member is provided with an axially cylindrical bore 28 which terminates at its opposite ends in the opposite sides or faces 30 or 32 of said inner bearing member, said sides 30 and 32 being provided with circular bosses 34 and 36, respectively.

Provision is made for retaining the inner bearing member 12 in the outer bearing member 10 and for providing a spherically concave surface complemental to the spherically concave surface 18 of the outer bearing member 10, after the inner bearing member 12 is inserted into the outer bearing member 10 through the opening defined by the circular edge 24 of the latter. For this purpose, the outer bearing member 10 is provided with a peripherally extending groove 38 formed in the cylindrical surface 22 of the outer bearing member, said groove lying in a plane at right angles to the central axis B—B (Fig. 4) of outer bearing member 10 along a peripheral line located between the circular edge 24 and the coinciding inner ends of the spherical and cylindrical surfaces 18 and 22, respectively. A retaining and complemental bearing member 40 is provided with a peripheral projection or rib 42, which engages the outer bearing member 10 in said groove completely therearound, and with a spherically concave inner surface 44 which is of the same curvature as the complemental spherical surface 18 for bearing contact with the spherically convex surface 26 of the inner bearing member 12. Said member 40, which as illustrated in the drawings is of annular contour, is formed of spring steel and is split along a radially and transversely extending line indicated at 46 from the inner edge 48 to the outer edge of the peripheral rib 42.

In assembling the outer and inner bearing members 10 and 12, the latter is inserted into the opening 14 through the end thereof defined by the circular edge 24, this being done before the retaining and complementary bearing member 40 is inserted. The relative position of members 10 and 12 prior to the insertion of member 40 is illustrated in Fig. 6. Then member 40 is placed in retaining and complementary bearing position illustrated in Figs. 2 and 3 by engaging one end of the rib 42 of member 40 adjacent the split 46 thereof in groove 38 and progressively moving adjacent peripheral portions of said rib into said groove peripherally thereof until the opposite end of said rib at the split 46 is engaged in said groove. To permit this insertion of rib 42 in groove 38, inner bearing member 10 is positioned, for example, in the manner illustrated in Fig. 10 with the axis A—A thereof at an angle to the plane of the opening defined by circular edge 24 of bearing member 10 and while said inner bearing member 12 is thus positioned, the outer bearing member 10 is rotated about its axis B—B so as to bring adjacent peripheral portions of groove 38 progressively to the point at which corresponding portions of rib 42 are inserted in said groove.

After the rib 42 is inserted completely in groove 38, said inner bearing member 12 may be positioned so that its axis A—A coincides with the axis B—B of the outer bearing member 10, after which the cylindrical pin portions 52 of the forked connecting member 54 are inserted in the cylindrical bore 34 of bearing member 12 through the opposite ends, respectively, thereof. It will be understood that when the bearing member 12 is positioned in the outer member 10 in bearing relation therewith, said inner and outer members have a universal turning relation therebetween, the relative movement between said bearing members being limited by the engagement of pin portions 52 with the sides 16 and 17, respectively, of outer bearing member 10 at the adjacent sides, respectively, of said outer bearing member.

As here shown, the outer bearing member 10 is provided with an integral threaded extension or rod 56 providing means for connecting said outer bearing member to a companion member (not shown) or for securing said outer member in a fixed position, as the case may be. The spherical self-alignment bearing device of the present invention may be used for various purposes, for example, for connecting the ends of cables or rods or other devices to each other, in which case one end of a cable or rod can be connected to the rod portion 56 of outer bearing member 10 and one end of a cable or rod can be connected to the rod portion 58 of forked member 54; or the outer member 10 can be anchored to a fixed support by means of the threaded rod 56 with a companion rod (not shown), while a cable or other device is connected to the forked member 54. It will be understood, however, that these uses and methods of connecting the inner and outer bearing members to companion devices are given only by way of example and are not to be considered in any respect as limitative of the uses of the spherical bearing devices of the present invention.

While I have shown and described the preferred embodiment of my invention, it will be understood that the latter may be embodied otherwise than as herein illustrated or described, and that in the illustrated embodiment certain changes in the details of construction and in the arrangement of parts may be made. Therefore, I do not wish to be limited to the invention as herein specifically illustrated or described except to the extent which may be required by the scope of the appended claims.

Having thus described my invention, what I claim and desire to secure by Letters Patent is:

1. In a self-alignment bearing device which has an inner member provided with a spherically convex outer peripheral bearing surface, an outer bearing member having an axial opening therein defined by a cylindrical surface having a diameter at least as large as the maximum diameter of said inner bearing member and by a spherically concave surface continuous with said cylindrical surface and extending axially in a direction away from the inner end of said first mentioned surface, the maximum diameter of said concave surface in a plane at right angles to the axis of said opening being substantially equal to said maximum diameter of said inner bearing member, said inner bearing member being positioned in said opening in movable bearing relation with said spherically concave surface and insertable into said outer bearing member through said opening, said first mentioned surface of said outer bearing member having a groove therein extending peripherally of said surface, and a retaining and complementary bearing member mounted in said cylindrical surface part of said opening in fixed relation to said outer bearing member axially thereof for holding said inner bearing member in said opening, said retaining member having a spherically concave inner surface in relatively movable bearing relation to said spherically convex surface of said inner bearing member and having a peripheral edge portion extending radially into said groove in said outer bearing member, said annular member being formed of spring metal and being split transversely thereof to provide the same with relatively movable ends whereby said annular member is insertable in said outer bearing member in said groove thereof by progressively inserting axially displaced portions of said annular member in said groove.

2. In a self-alignment bearing device which has an inner member provided with a spherically convex outer peripheral bearing surface, an outer bearing member having an axial opening therein defined by a cylindrical surface having a diameter at least as large as the maximum diameter of said inner bearing member and by a spherically concave surface continuous with said cylindrical surface and extending axially in a direction away from the inner end of said cylindrical surface, the maximum diameter of said concave surface in a plane at right angles to the axis of said opening being substantially equal to said maximum diameter of said inner bearing member, said inner bearing member being positioned in said opening in movable bearing relation with said spherically concave surface, the opposite ends of said opening being defined by circular edges of said outer bearing member at opposite sides, respectively, thereof, said edges lying in parallel planes at right angles to the axis of said opening at the outer ends of said cylindrical and spherically concave surfaces, respectively, said inner bearing member being insertable into said opening only through said outer end of the cylindrical surface, and a retaining and complementary bearing member mounted in said cylindrical surface part of said opening in fixed relation to said outer bearing member axially thereof for holding said inner bearing member in said opening, said retaining member having a spherically concave inner surface in relatively movable bearing relation to said spherically convex surface of said inner bearing member, said cylindrical surface of said outer bearing member having a groove therein extending peripherally of said cylindrical surface, and said retaining member having an integral peripheral portion extending radially therefrom and engaging said outer bearing member in said groove, said annular member being formed of spring metal and being split transversely thereof to provide the same with relatively movable ends whereby said annular member is insertable in said outer bearing member in said groove thereof by progressively inserting axially displaced portions of said annular member in said groove.

3. In a self-alignment bearing device which has an inner member provided with a spherically convex outer peripheral bearing surface, an outer bearing member having an axial opening therein defined by a cylindrical surface having a diameter at least as large as the maximum diameter of said inner bearing member and by a spherically concave surface continuous with said cylindrical surface and extending axially in a direction away from the inner end of said cylindrical surface, the maximum diameter of said concave surface in a plane at right angles to the axis of said opening being substantially equal to said maximum diameter of said inner bearing member, said inner bearing member being positioned in said opening in movable bearing relation with said spherically concave surface, the opposite ends of said opening being defined by circular edges of said outer bearing member at opposite sides, respectively, thereof, said edges lying in parallel planes at right angles to the axis of said opening at the outer ends of said cylindrical and spherically concave surfaces, respectively, said inner bearing member being insertable into said opening only through said outer end of the cylindrical surface, said cylindrical surface having a peripheral groove therein in a plane at right angles to said axis of the opening, and an annular retaining member having a peripheral edge portion engaging said outer member in said groove and a peripheral portion having a spherically concave inner surface in relatively movable bearing relation with said spherically convex surface of said inner bearing member, said annular member being formed of spring metal and being split transversely thereof to provide the same with relatively movable ends whereby said annular member is insertable in said outer bearing member in said groove thereof by progressively inserting axially displaced portions of said annular member in said groove.

VICTOR S. COLLITO.